April 5, 1932.                E. PRICE                1,852,857
                               BRAKE
                         Filed April 19, 1929
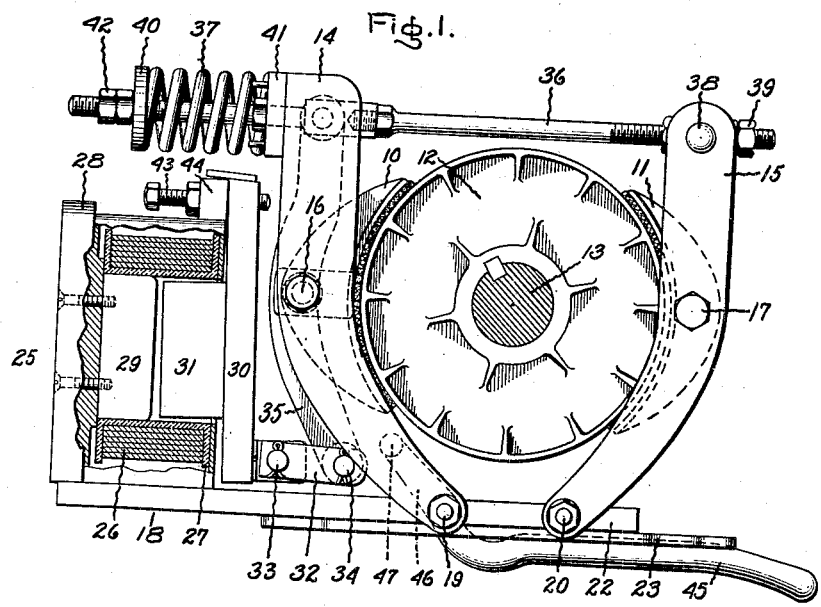
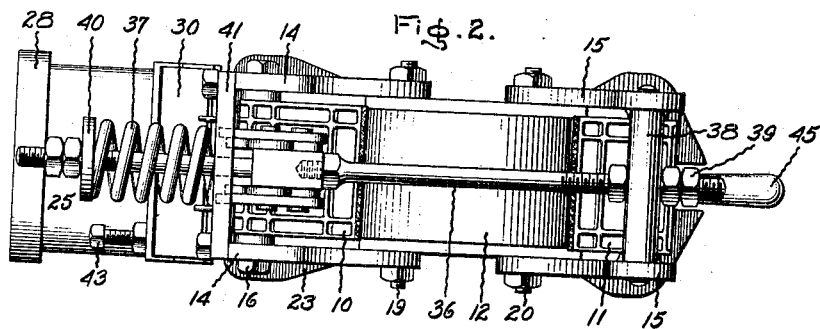
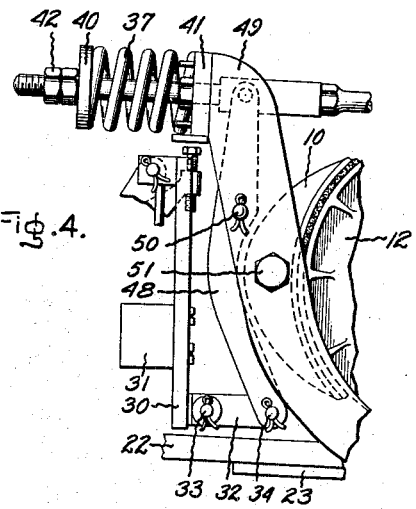
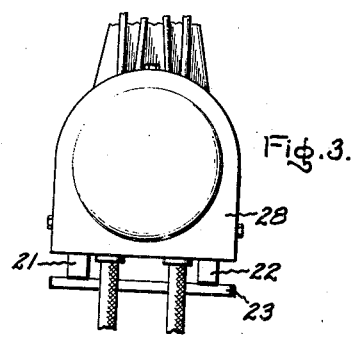
Inventor:
Edgar Price,
by Charles E. Mullar
His Attorney.

Patented Apr. 5, 1932

1,852,857

UNITED STATES PATENT OFFICE

EDGAR PRICE, OF SCHENECTADY, NEW YORK, ASSIGNOR TO GENERAL ELECTRIC COMPANY, A CORPORATION OF NEW YORK

BRAKE

Application filed April 19, 1929. Serial No. 356,533.

My invention relates to brakes, more particularly to brakes of the normally applied and electromagnetically released type. In brakes of this type the releasing electromagnet, together with the arms carrying the brake shoes and the interconnecting operating mechanism, are usually mounted upon a unitary base or supporting structure. With the ordinary construction a large bending stress usually is imposed on the base member and in order to withstand this bending stress the base members must be made very large and heavy.

One of the objects of my invention is the provision of an improved construction for a brake of this type which permits the required force to be exerted by the controlling electromagnet without imposing an undue strain or bending stress on the base.

My improved brake construction also involves various other advantageous features among which are the provision of wear-adjusting means for the brake shoes arranged to maintain constant the force of the brake applying spring, as well as a manually operated arm arranged to cooperate with the electromagnet releasing mechanism so that the brake shoes may be released and held released independently of the electromagnet whenever desired.

The several improvements of the invention will be better understood from the following description taken in connection with the accompanying drawings and its scope will be pointed out in the appended claims.

Referring to the drawings, Figure 1 is a side elevation partly in section of a brake embodying the invention; Figure 2 is a plan view and Figure 3 a left end view of the brake shown in Figure 1; while Figure 4 is a side elevation of a modification of the actuating linkage shown in Figure 1.

In the drawings I have shown a brake in which a pair of friction brake shoes 10 and 11, are adapted to engage a rotatable brake drum 12. The brake drum is keyed to a shaft 13, the rotation of which it is desired to control. The brake shoes 10 and 11 are pivotally supported on the brake arms 14 and 15 formed of flat members by means of pivot pins 16 and 17 respectively and the brake arms 14 and 15 are in turn pivotally mounted upon a base member 18 by means of pivot pins 19 and 20 passing through the lower ends thereof. The base member 18 is formed of a pair of bars or rods 21 and 22 to the lower sides of which is secured, by welding or other suitable means, a relatively thin plate 23. Thus it will be observed that the base member 18 is relatively light in weight and of a simple inexpensive construction.

The actuating electromagnet 25 has a magnetic winding 26 wound upon a spool 27 mounted on the magnetic frame 29 which in turn is mounted upon the support 28 extending from the base 18. An armature 30 is pivotally supported at the upper side of the right hand end of the electromagnet 25, this armature depending substantially vertically across the face of the magnetic frame. The armature 30 is provided with a projection 31 of magnetic material, this projection being arranged to extend within the spool 27 closely adjacent the magnetic frame 29. Thus the electromagnet 25 is secured to the base bars 21 and 22 in a horizontal position, that is, with the axis of the magnet parallel to the plane of the base member 18 and in this way the lower end of the armature 30 is brought into close proximity to the upper side of the base member 18 and into substantial alignment with the pivot pins 19 and 20.

In order to transmit motion from the armature 30 to the brake arms 14 and 15, and thus to the brake shoes 10 and 11, a motion-transmitting linkage is provided comprising a short link 32 pivotally connected at one end by means of a pivot pin 33 to the lower extremity of the armature 30 and pivotally connected at its other end by means of the pivot pin 34 to the lower end of a lever 35. In the embodiment of my invention disclosed in Figure 1 the lever 35 is pivotally supported on the brake arm 14 at a point substantially at its center by the pivot pin 16. The upper end of the lever 35 is pivotally attached to a longitudinal member or rod 36. This rod serves to connect the upper ends of the brake arms 14 and 15 through the medium of a helical compression spring 37.

The right hand end of the rod 36 passes through an aperture in a cross pin 38 secured to the arm 15 and by means of suitable nuts 39 threaded on the rod, the position of the rod 36 with respect to the arm 15 may be varied. The left hand end of the rod 36 passes through a washer 40 which serves as an abutment for one end of the compression spring 37. The spring 37 abuts at its other end against a cross bar 41 secured to the upper end of the arm 14. Threads are also provided on the left hand end of the rod 36 and by adjusting suitable nuts 42, the compression action of the spring 37 may be varied.

An adjusting screw 43 is mounted in a fixed support 44 carried by the electromagnet 25 and normally projects into the path of the arm 14 to control the released position thereof. Thus by threading the adjusting screw 43 into or out of the support 44 the amount of movement of the brake arm 14 away from the brake drum may be regulated.

A manually operable lever 45 is pivotally mounted on the base 18 by means of the pivot pin 19 and this lever 45 is provided with an extension 46 having a projection 47 at its free end for engaging with the lower end of the lever 35, and thereby releasing the brake independently of the electromagnet 25 when desired.

With the construction as thus described when the electromagnet 25 is not energized the compression spring 37 will bias the upper ends of the supporting yokes 14 and 15 toward each other, thereby causing brake shoes 10 and 11 normally to be applied to the brake drum 12. To release the brake so that the shaft 13 may turn freely, the electromagnet 25 is energized from a suitable source of supply and the armature 30 and projection 31 will be attracted and moved toward the core 29. Thereupon lever 35 together with brake arm 14 will be moved toward the left until the arm engages with the adjusting screw 43, whereupon its motion will be stopped. However with brake shoe 10 disengaged from the brake drum the lever 35 being pivoted on the pin 16 will continue to move about this pin in a clockwise direction and the upper end of the lever 35 will force the rod 36 to the right, thereby disengaging the other brake shoe 11 from the brake drum.

In case it should be desired to manually release the brake shoes 10 and 11 from the brake drum as in making adjustments or repairs, the lever 45 may be raised and the projection 47 at the end of the extension 46 will engage the right hand end of the link 32, and by cam action cause this link and the armature 31 to move to the left in a manner similar to that just described even though the electromagnet 25 remains deenergized. This cam arrangement is such that the brake arms remain locked in the released position when the lever 45 is raised to its full extent. In case the brake shoes 10 and 11 are held locked in the disengaged position by the lever 45 and it is desired to cause the brake shoes to engage the brake drum, this may be accomplished either by manually lowering the lever 45 or by energizing the electromagnet 25. In the latter case when the electromagnet is energized the armature 30 will be attracted toward the left to disengage the right hand end of the arm 32 from the projection 47 whereupon the hand lever 45 will return to its initial position in accordance with its bias.

When it is desired to compensate for the wear of the friction surfaces of the brake shoes 10 and 11 it is necessary only to adjust the nuts 39 so as to shorten the effective length of the rod 36. By adjusting the nuts 42 at the left hand end of the rod 36 the biasing force of the spring 37 may be varied without changing the position of the brake shoes 10 and 11. Then in order to equalize the clearance between the brake shoes 10 and 11 and the brake drum 12, the screw 43 may be adjusted.

It will be observed that by arranging the electromagnet with its axis parallel to the base member 18 and by connecting the arm 32 to the lower ends of the armature 30 and the lever 35 in close proximity to the base member 18, there will be practically no bending stress imposed in the base member 18 on the energization of the electromagnet. The stress imposed will be compressive rather than of a bending nature and for this reason the base member may be of much lighter construction than could be the case if there were a bending stress imposed therein.

Figure 4 of the drawings illustrates a modification of the motion transmitting linkage. In this modification the lever 48 corresponding to lever 35 of Figure 1 is pivoted to the supporting yoke 49 by means of a separate pivot pin 50 rather than by means of the pin 51 which corresponds to the pin 16 in Figure 1. The operation of the brake when the lever 48 is pivoted to the yoke 49 as shown in Figure 4 is substantially the same as that of the brake shown in Figure 1. However, with a separate pivot mounting for the lever 48 the parts may be assembled more readily and this is especially advantageous in the case of large brakes wherein the pivot pin 51 would need to be made such larger in order to support the lever 48, as well as the brake shoe 10.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with a brake drum of a pair of brake shoes therefor, a base comprising a pair of spaced apart bars, a pair of spaced apart supporting arms for each of said brake shoes, the corresponding arms of each pair being pivotally mounted at the ends of said base bars, an electromagnet mounted on the other ends of said base bars and having an armature movable transverse the base, resilient connecting means between the free ends of said supporting arms, said electromagnet and said resilient means being adjacent each other, and a linkage connecting said armature to the free ends of one pair of said supporting arms and to said resilient connecting means, the point of connection between said linkage and said armature being in substantial alinement with the points of connection between said supporting arms and said base bars, whereby bending stress in said base bars will be reduced to a minimum, and means mounted on said base member and cooperating with said link mechanism whereby said brake shoes may be manually set in the disengaged position until said electromagnet is energized.

2. The combination with a brake drum and opposed brake shoes therefor, a base comprising a pair of spaced apart bars, an actuating means for said brake shoes mounted on the ends of said bars and including an electromagnet having a pivotally mounted armature, a pair of spaced apart arms for supporting each of said brake shoes pivotally mounted at the other ends of said bars, means connected to said supporting arms for normally biasing said arms toward each other to cause said brake shoes to engage said brake drum, said last means being mounted adjacent said electromagnet, means for transmitting motion from said armature to one pair of said supporting arms and to said biasing means so as to disengage said brake shoes from said brake drum when said electromagnet is energized, and a single means for adjusting said biasing means to compensate for wear of said brake shoes and for adjusting said motion transmitting means to equalize the clearance between said brake shoes and said brake drum.

3. In a brake, the combination with a brake drum and a pair of opposed brake shoes therefor, of a base member, supporting yokes for said brake shoes pivotally mounted on said base member, an electromagnet mounted on said base member with its axis parallel to said base member, an armature for said electromagnet and a linkage connected between said armature and said supporting yokes whereby movement of said armature in a predetermined direction will cause said brake shoes to be disengaged from said brake drum while imposing a minimum of bending stress in said base member, and means mounted on said base member and cooperating with said linkage whereby said brake shoes may be manually set in the disengaged position until said electromagnet is energized.

4. The combination with a brake drum and opposed brake shoes therefor, of actuating means for said brake shoes including an electromagnet having a pivotally mounted armature, supporting yokes for said brake shoes, means connected to said supporting yokes for normally biasing said yokes toward each other to cause said brake shoes to engage said brake drum, means for transmitting motion from said armature to one of said supporting yokes and to said biasing means so as to disengage said brake shoes from said brake drum when said electromagnet is energized, and means arranged to cooperate with said motion transmitting means whereby said brake shoes may be manually set in the disengaged position until said electromagnet is energized.

5. In a brake, the combination with a brake drum and a pair of opposed brake shoes therefor, a pair of supporting arms for each of said brake shoes, a base comprising a pair of spaced apart bars extending between each pair of said supporting arms and pivotally supporting said arms at the ends thereof, resilient means connecting adjacent ends of said supporting arms, each of said brake shoes being attached by means of a pivot pin to its respective pair of supporting arms, an electromagnet secured to said base bars at the other ends thereof, and having its axis parallel to said base bars, an armature for said electromagnet, said armature being hingedly supported at one end, a lever attached at one end to said resilient connecting means and at a point substantially at its center to one of said pivot pins, a link connecting the other ends of said armature and said lever, and a single means between said resilient connecting means and one pair of said supporting arms for adjusting said resilient connecting means to compensate for wear of said brake shoes and to maintain constant the air gap between said electromagnet and said armature as said brake shoes become worn.

6. In a brake, the combination of a brake drum, a pair of brake shoes disposed on opposite sides thereof, a pair of spaced apart supporting arms for each brake shoe having means for supporting the brake shoe therebetween, a base comprising a pair of spaced apart bars extending between each pair of said spaced apart supporting arms and having means for pivotally mounting the pairs of arms at one end of the bars, an electromagnet mounted at the opposite end of said bars and having an armature pivoted at one end with the other end movable in the space between the electromagnet and the said supporting arms, and operating connections between the said other end of said armature and the supporting members including a lever arm pivoted between the pair of supporting arms adjacent said electromagnet with one end thereof connected to the other pair of supporting arms and the other end thereof connected to said other end of said armature, and means mounted on said base member and cooperating with said lever whereby said brake shoes may be manually set in the disengaged position until said electromagnet is energized.

In witness whereof, I have hereunto set my hand this 18th day of April, 1929.

EDGAR PRICE.